US010261469B2

(12) United States Patent
Niu et al.

(10) Patent No.: US 10,261,469 B2
(45) Date of Patent: Apr. 16, 2019

(54) HOLOGRAM RECORDING DEVICE AND HOLOGRAM RECORDING METHOD

(71) Applicant: Boe Technology Group Co., Ltd., Beijing (CN)

(72) Inventors: Bei Niu, Beijing (CN); Naifu Wu, Beijing (CN); Wei Wei, Beijing (CN); Tao Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 132 days.

(21) Appl. No.: 14/913,273

(22) PCT Filed: Jul. 20, 2015

(86) PCT No.: PCT/CN2015/084419
§ 371 (c)(1),
(2) Date: Feb. 19, 2016

(87) PCT Pub. No.: WO2016/138723
PCT Pub. Date: Sep. 9, 2016

(65) Prior Publication Data
US 2017/0003651 A1 Jan. 5, 2017

(30) Foreign Application Priority Data
Mar. 2, 2015 (CN) .......................... 2015 1 0092931

(51) Int. Cl.
G03H 1/02 (2006.01)
G03H 1/04 (2006.01)
(Continued)

(52) U.S. Cl.
CPC ............... *G03H 1/12* (2013.01); *G03H 1/041* (2013.01); *G03H 1/0406* (2013.01);
(Continued)

(58) Field of Classification Search
CPC .. G03H 1/0402; G03H 1/0404; G03H 1/0406; G03H 2001/0413;
(Continued)

(56) References Cited

U.S. PATENT DOCUMENTS 3,899,240 A    8/1975 Gabor
5,949,557 A    9/1999 Powell
(Continued)

FOREIGN PATENT DOCUMENTS

CA    2246258    2/2000
CN    1177075    3/1998
(Continued)

OTHER PUBLICATIONS

Vannoni et al., One-Step 360° Rainbow Holography, Optics & Photonics News, Dec. 2001, p. 19.*
(Continued)

Primary Examiner — Kimberly N. Kakalec
(74) Attorney, Agent, or Firm — Calfee, Halter & Griswold LLP

(57) ABSTRACT

The present disclosure discloses a hologram recording device and a hologram recording method. The hologram recording device comprises an object imaging unit comprising a cavity for accommodating an object whose interior wall is a reflective surface, and a light modulating unit configured to produce incident light and reference light interfering with the incident light and to direct the incident light to the object imaging unit. The cavity is provided with an imaging aperture for imaging of the object and at least one light incidence aperture for allowing the incident light to enter the cavity and irradiate on the object, such that an image of the object is formed at a location corresponding to the imaging aperture outside the cavity, and image light produced upon the imaging of the object interferes with the
(Continued)

reference light at the location for recording of an image surface hologram.

12 Claims, 2 Drawing Sheets

(51) Int. Cl.
*G03H 1/12* (2006.01)
*G03H 1/22* (2006.01)

(52) U.S. Cl.
CPC ............... *G03H 2001/0216* (2013.01); *G03H 2001/0428* (2013.01); *G03H 2001/2257* (2013.01); *G03H 2222/12* (2013.01); *G03H 2222/42* (2013.01); *G03H 2222/44* (2013.01); *G03H 2223/24* (2013.01)

(58) Field of Classification Search
CPC ... G03H 2001/0415; G03H 2001/0417; G03H 2001/0419; G03H 2001/0428; G03H 2001/0434; G03H 2001/2207; G03H 1/12; G03H 1/041; G03H 2001/2257; G03H 2001/0216; G03H 2222/44; G03H 2222/12; G03H 2222/42; G03H 2223/24
See application file for complete search history.

(56) References Cited

U.S. PATENT DOCUMENTS

| | | |
|---|---|---|
| 2001/0013959 A1 | 8/2001 | Long |
| 2001/0035991 A1 | 11/2001 | Hobbs et al. |
| 2003/0072045 A1 | 4/2003 | King et al. |
| 2005/0270605 A1* | 12/2005 | Moon ..................... G03H 1/04 359/3 |
| 2006/0152784 A1* | 7/2006 | Usami ................ G02B 27/2292 359/28 |
| 2007/0153345 A1 | 7/2007 | Tsukagoshi et al. |
| 2011/0267666 A1* | 11/2011 | Redmond ............ G03H 1/0408 359/32 |

FOREIGN PATENT DOCUMENTS

| | | |
|---|---|---|
| CN | 1431463 | 7/2003 |
| CN | 101635150 | 1/2010 |
| CN | 101681147 | 3/2010 |
| CN | 104656404 | 5/2015 |
| JP | 2000112323 | 4/2000 |
| KR | 20040028143 | 4/2004 |

OTHER PUBLICATIONS

Vannoni et al. (One-step 360° rainbow holography with two spherical mirrors, Applied Optics vol. 40, No. 5, pp. 633-635, Feb. 10, 2001).*

Office Action from China Application No. 201510092931.3 dated Oct. 24, 2016.

International Search Report and Written Opinion from PCT/CN15/84419 dated Nov. 20, 2015.

Office Action from China Application No. 201510092931.3 dated Feb. 27, 2017.

Paul K Buah-Bassuah et al: "One-step real-image reflection holograms", European Journal of Physics, Nstitute of Physics Publishing, Bristol, GB, vol. 28, No. 2, Mar. 1, 2007 (Mar. 1, 2007), pp. 359-365, XP020113395, ISSN: 0143-0807, DOI: 10.1088/0143-0807/28/2/021.

Search Report for European Patent Application No. 15832667.8 dated Dec. 18, 2018.

* cited by examiner

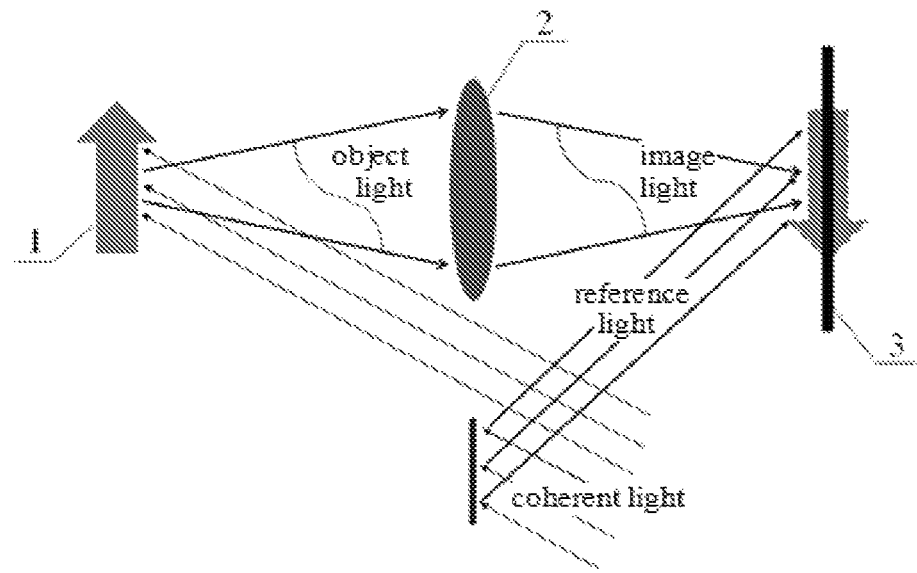
Fig. 1
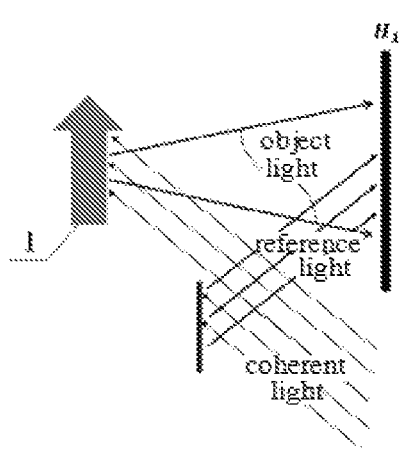 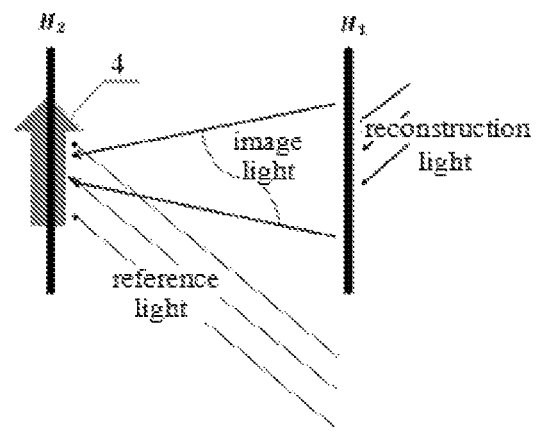
Fig. 2a          Fig. 2b

HOLOGRAM RECORDING DEVICE AND HOLOGRAM RECORDING METHOD

RELATED APPLICATIONS

The present application is the U.S. national phase entry of PCT/CN2015/084419 with an International filing date of Jul. 20, 2015, which claims the benefit of Chinese Application No. 201510092931.3, filed Mar. 2, 2015, the entire disclosures of which are incorporated herein by reference.

TECHNICAL FIELD

The present disclosure relates to the field of holographic display technologies, and particularly to a hologram recording device and a hologram recording method.

BACKGROUND

In recording a hologram, if an object is close to a recording medium, reference light will not be introduced conveniently. Hence, it is usual to produce image light by way of imaging, and allow the image light to interfere with the reference light to complete the recording of the hologram. There are usually two schemes for image surface hologram recording: one is to employ a lens imaging method, and the other is to employ a two-step recording method.

FIG. 1 is a schematic view of a lens imaging method. According to the lens imaging method, a lens 2 is used to image an object 1 to produce image light, and then interference stripes of the image light with the reference light are recorded on a holographic plate 3 to implement the recording of the image surface hologram. This method is the one-step hologram recording method, which does not require a complicated light path. However, due to limitations of a lens manufacturing process and an aperture, the image surface hologram recorded by this method may distort with a small angle of field of view.

FIGS. 2a and 2b are schematic views of a two-step recording method. According to the two-step recording method, a Fresnel hologram $H_1$ is usually recorded for an object 1 first, then conjugate light (reconstruction light as shown in FIG. 2b) of the reference light is used to illuminate the hologram $H_1$ to reconstruct an objective image 4, and the image light of the objective image 4 is superimposed with the reference light to obtain an image surface hologram $H_2$. This method comprises two times of recording and one time of reconstruction, which is complicated in operation and has large noises.

SUMMARY

It is an object of the present disclosure to provide a hologram recording device and a hologram recording method to simply and efficiently implement the recording of an image surface hologram, and to improve the imaging quality.

To address the above technical problem, according to a first aspect of the present disclosure, a hologram recording device is provided comprising an object imaging unit comprising a cavity for accommodating an object, an interior wall of the cavity being a reflective surface, and a light modulating unit configured to produce incident light and reference light interfering with the incident light and to direct the incident light to the object imaging unit, wherein the cavity is provided with an imaging aperture for imaging of the object and at least one light incidence aperture for allowing the incident light to enter the cavity and irradiate on the object, such that an image of the object is formed at a location corresponding to the imaging aperture outside the cavity, image light produced upon the imaging of the object interfering with the reference light at the location for recording of an image surface hologram.

In an embodiment, the object imaging unit comprises an upper parabolic mirror and a lower parabolic mirror whose reflective surfaces are arranged opposite to each other, the upper parabolic mirror and lower parabolic mirror jointly forming the cavity.

In an embodiment, the imaging aperture is arranged at a top end of the upper parabolic mirror.

In an embodiment, the light incidence aperture is provided with a beam expander for beam expansion of the incident light irradiating into the light incidence aperture to allow the incident light to fill the cavity. In an embodiment, the hologram recording device further comprises a recording unit comprising a holographic plate arranged at the location, the image light interfering with the reference light on the holographic plate.

In an embodiment, the holographic plate comprises a transparent substrate and a photosensitive material arranged on the substrate. In an embodiment, the light modulating unit comprises a laser and a second beam splitter, light emitted by the laser passing through the second beam splitter and then producing the incident light for irradiating the object and the reference light.

In an embodiment, the light modulating unit further comprises a third reflective mirror for adjusting a propagation direction of the reference light to allow the reference light to interfere with the image light at the location.

In an embodiment, the light modulating unit further comprises a spatial filter disposed between the second beam splitter and the third reflective mirror, the spatial filter configured to filter noise in the reference light.

In an embodiment, the object imaging unit is provided with two light incidence apertures located on both sides of the imaging aperture, respectively, and the light modulating unit further comprises a first beam splitter, a first reflective mirror and a second reflective mirror, the first beam splitter configured to split the incident light into two beams of light, the first reflective mirror and the second reflective mirror configured to adjust an incident direction of the above two beams of light respectively so that the two beams of light irradiate into the two light incidence apertures respectively.

In an embodiment, the second beam splitter and first beam splitter each are a variable beam splitter, and the third reflective mirror, the first reflective mirror and the second reflective mirror each are a collimating reflective mirror.

According to a second aspect of the present disclosure, a hologram recording method using the above hologram recording device is provided. The hologram recording method is used for recording of an image surface hologram. The hologram recording method comprises steps of:

placing an object to be imaged in the cavity of the object imaging unit;

providing incident light by the light modulating unit so that the incident light irradiates on the object through the light incidence aperture;

and forming an objective image at a location corresponding to the imaging aperture outside the cavity by the incident light irradiating on the object and being reflected by the reflective surface inside the cavity.

In an embodiment, the hologram recording method further comprises: producing reference light interfering with the incident light by using the light modulating unit;

arranging a holographic plate at the location corresponding to the imaging aperture outside the cavity;

interfering image light produced upon the imaging of the object with the reference light on the holographic plate; and recording interference stripes.

The object imaging unit in the present disclosure may be free from limitations and impact of the lens manufacturing process, and may effectively reduce aberration, improve the imaging quality, and obtain a hologram with a wide angle of view and small distortion. Moreover, a special light path design according to the present disclosure may achieve one-step hologram recording, allowing for a more efficient and simple recording procedure.

BRIEF DESCRIPTION OF THE DRAWINGS

The accompanying drawings are provided for a further understanding of the present disclosure and form a portion of the description. The figures, together with the following detailed description, are used for illustration of the present disclosure and are not to be construed as limiting the present disclosure.

FIG. 1 is a schematic view of a lens imaging method;

FIGS. 2a and 2b are schematic views of a two-step recording method;

Figure 3:
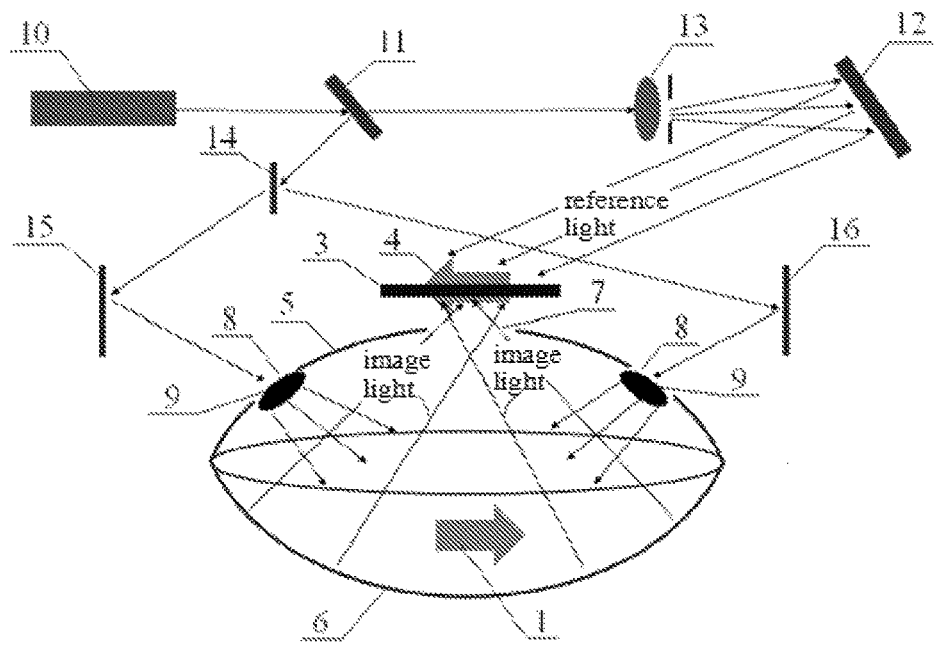
FIG. 3 is a schematic view of a hologram recording device according to an embodiment of the present disclosure.

In the drawings:
1—object; 2—lens; 3—holographic plate; 4—objective image; 5—upper parabolic mirror; 6—lower parabolic mirror; 7—imaging aperture; 8—light incidence aperture; 9—beam expander; 10—laser; 11—second beam splitter; 12—third reflective mirror; 13—spatial filter; 14—first beam splitter; 15—first reflective mirror; 16—second reflective mirror.

DETAILED DESCRIPTION

Embodiments of the present disclosure will be described in detail with reference to the accompanying drawings. It should be appreciated that embodiments described here are only for purposes of illustration and explanation of the present disclosure, and not for purposes of limitation of the present disclosure.

According to a first aspect of the present disclosure, a hologram recording device is provided comprising a light modulating unit and an object imaging unit. The light modulating unit is used to produce incident light and direct the incident light to the object imaging unit. The object imaging unit comprises a cavity for accommodating the object, and an interior wall of the cavity is a reflective surface. The cavity is provided with an imaging aperture for imaging of the object and at least one light incidence aperture for allowing the incident light to enter the cavity, such that an image of the object is formed at a location corresponding to the imaging aperture outside the cavity.

Especially, the light modulating unit may use the incident light to produce reference light that interferes with the incident light. Further, the object imaging unit refers to a unit that enables an object to form an image under light irradiation, wherein the image light produced during the imaging procedure may interfere with the reference light to complete the recording of the image surface hologram.

FIG. 3 is a schematic view of a hologram recording device according to an embodiment of the present disclosure. In an implementation, as shown in FIG. 3, the object imaging unit comprises an upper parabolic mirror 5 and a lower parabolic mirror 6 whose reflective surfaces are arranged opposite to each other, wherein inwardly recessed surfaces of the upper parabolic mirror 5 and the lower parabolic mirror 6 are mirror surfaces. The upper parabolic mirror 5 and lower parabolic mirror 6 jointly form the cavity, and an interior wall of the cavity is a reflective surface.

An imaging aperture 7 and a light incidence aperture 8 may be arranged on either the upper parabolic mirror 5 (as shown in FIG. 3) or the lower parabolic mirror 6. Alternatively, the imaging aperture 7 and light incidence aperture 8 may be arranged on different parabolic mirrors respectively, so long as conditions for the imaging of the object 1 are satisfied. The incident light passes through the light incidence aperture 8 and irradiates on the object 1, and the image light produced upon the imaging of the object 1 may interfere with the reference light at a location corresponding to the imaging aperture 7 outside the cavity.

Figure 4A:
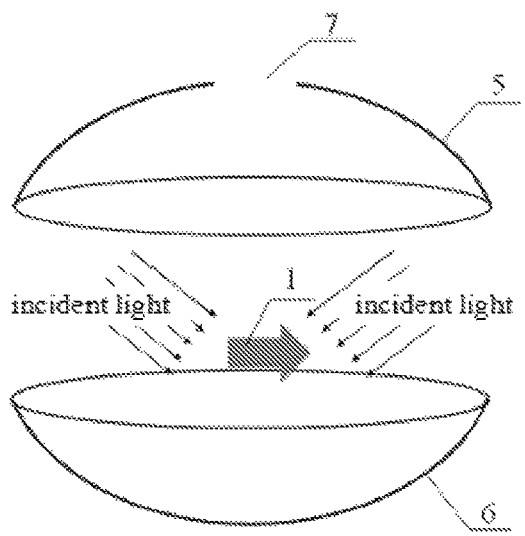
FIGS. 4a and 4b are schematic diagrams of a principle of double parabolic mirror imaging.
Figure 4B:
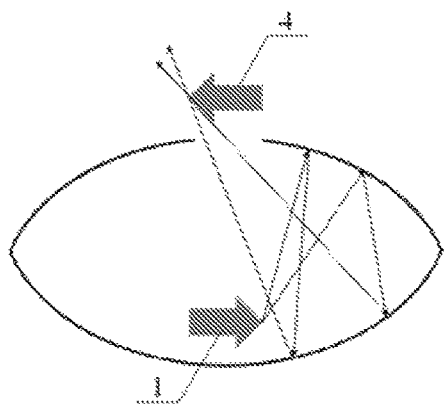

FIGS. 4a and 4b each are a schematic diagram of a principle of double parabolic mirror imaging. The object 1 is placed at a bottom of the lower parabolic mirror 6, and then the upper parabolic mirror 5 is lowered. Multiple light rays reflected from a point on the object 1 that is under irradiation of the incident light undergo several times of reflection by the upper and lower parabolic mirrors and then converge to the location corresponding to the imaging aperture 7 outside the cavity, to form an image point. Each point on the object 1 may experience such an imaging procedure, and finally an objective image 4 is formed at the location corresponding to the imaging aperture 7 outside the cavity.

As compared with the solution in which lens imaging is employed, the double parabolic mirror structure formed by the upper parabolic mirror 5 and lower parabolic mirror 6 in the present disclosure may be free from limitations and impact of the lens manufacturing process, and may effectively reduce aberration, improve the imaging quality, and obtain a hologram with a wide angle of view and less distortion. Moreover, a special light path design according to the present disclosure may achieve one-step hologram recording, avoiding complicated operations of the two-step recording method in the prior art, and thus enabling a more efficient and simple recording procedure.

In an embodiment, the imaging aperture 7 may be arranged at a top end of the upper parabolic mirror 5. When the object 1 is located in the cavity formed by the upper parabolic mirror 5 and lower parabolic mirror 6, the object 1 is usually located at a center of the bottom of the lower parabolic mirror 6. Thus, the pin-hole imaging effect may be made more uniform by arranging the imaging aperture 7 at the top end of the upper parabolic mirror 5.

Further, the light incidence aperture 8 may be provided with a beam expander 9, and the beam expander 9 is used to perform beam expansion for the incident light irradiating into the light incidence aperture 8 to allow the incident light to fill the cavity. The scattered light irradiates on the object 1 and experiences diffuse reflection. The diffusely reflected light undergoes reflection by the upper and lower parabolic mirrors to form an image at the location corresponding to the imaging aperture 7 outside the cavity.

Further, the hologram recording device may further comprise a recording unit, and the recording unit comprises a holographic plate 3 which is arranged at a location corresponding to the imaging aperture 7 outside the cavity. The image light interferes with the reference light on the holographic plate 3 which records interference stripes formed by both of them. After the interference stripes are recorded, the objective image may be reconstructed, provided that the holographic plate 3 is irradiated by coherent light again.

In an embodiment, the holographic plate 3 may be a transmission type holographic plate. The image light irradiates from a side of the holographic plate 3 onto the holographic plate 3, and the reference light irradiates from the other side of the holographic plate 3 onto the holographic plate 3. The holographic plate 3 usually comprises a transparent substrate and a photosensitive material arranged on the to substrate. In an embodiment, the transparent substrate may be made of plastic or glass, and the photosensitive material may be photoresist, silver halide or the like, which may be arranged on either one side of the substrate or both sides of the substrate. It is to be noted that using the holographic plate 3 to record the interference stripes is only a common and specific implementation, and that in other embodiments other forms of media may be employed to record the interference stripes. In other words, the medium for recording the interference stripes is not limited to the described types, provided that it can achieve the technical solution of the present disclosure.

In addition, in the embodiment shown in FIG. 3, the light modulating unit comprises a laser 10 and a second beam splitter 11. Light emitted by the laser 10 passes through the second beam splitter 11 and then produce the incident light for irradiating the object 1 and the reference light. The incident light is used to generate image light that interferes with the reference light. Since the laser has advantages such as good monochromaticity, good directionality and high brightness, light split from the laser exhibits excellent coherence and thus is very suitable for being applied in the device for hologram recording.

The light modulating unit further comprises a third reflective mirror 12. The third reflective mirror 12 is used to adjust a propagation direction of the reference light so that the reference light may interfere with the image light at the location corresponding to the imaging aperture 7 outside the cavity. For example, in FIG. 3, the third reflective mirror 12 reflects the reference light to one side of the holographic plate 3 and the image light irradiates to the other side of the holographic plate 3 to record the image surface hologram in a transmission and interference manner. In an embodiment, the light modulating unit may further comprise a spatial filter 13 which is disposed between the second beam splitter 11 and the third reflective mirror 12. The spatial filter is configured to filter noise in the reference light.

As a specific implementation, the object imaging unit may be provided with two light incidence apertures 8. To make the imaging quality better, the two light incidence apertures 8 are located on both sides of the imaging aperture 7 respectively, as shown in FIG. 3. Since the object 1 is placed at the bottom of the lower parabolic mirror 6, the two light incident apertures 8 may be arranged on the upper parabolic mirror 5. The light modulating unit may further comprise a first beam splitter 14, a first reflective mirror 15 and a second reflective mirror 16, wherein the first beam splitter 14 is used to split the incident light into two beams of light, and reflective surfaces of the first reflective mirror 15 and the second reflective mirror 16 face the corresponding light incidence apertures 8 respectively and are used to adjust an incident direction of the two beams of light, such that the two beams of light irradiate respectively into the two light incidence apertures 8 on both sides. After passing through the two beam expanders 9, light irradiates on the object 1 in a scattered manner and experiences diffuse reflection. The diffusely reflected light undergoes reflection by the upper and lower parabolic mirrors to form an image at the location corresponding to the imaging aperture 7 outside the cavity.

Both the second beam splitter 11 and first beam splitter 14 may employ a variable beam splitter to make a proportion between transmitted light beams and reflected light beams adjustable. Meanwhile, the third reflective mirror 12, the first reflective mirror 15 and the second reflective mirror 16 may employ a collimating reflective mirror to further improve collimating property of the light, thereby better maintaining coherence of the image light with the reference light.

According to a second aspect of the present disclosure, a hologram recording method is provided for recording an image surface hologram. The hologram recording method comprises the following steps:

placing an object to be imaged in the cavity of the object imaging unit;

providing incident light by the light modulating unit so that the incident light irradiates on the object through the light incidence aperture; and forming an objective image at the location corresponding to the imaging aperture outside the cavity by the incident light irradiating on the object and being reflected by the reflective surface inside the cavity.

In an embodiment, the hologram recording method further comprises:

producing reference light interfering with the incident light by using the light modulating unit;

arranging a holographic plate at the location corresponding to the imaging aperture outside the cavity;

interfering image light produced upon the imaging of the object with the reference light on the holographic plate; and recording interference stripes.

In some embodiments of the present disclosure, on the one hand, impact exerted by the object imaging unit on hologram recording is reduced, the aberration is decreased and the imaging quality is improved. On the other hand, one-step recording of the hologram is achieved, which makes the recording procedure more efficient and simple.

Referring back to FIG. 3, in this example, specific steps of recording the image surface hologram are as follows.

The laser 10 emits laser which is split by the second beam splitter 11 into two beams of light, one for producing the reference light and the other for the image light.

After the filtering-out of the noise by the spatial filter 13, the beam of light for producing the reference light is reflected by the third reflective mirror 12 onto the holographic plate 3.

The beam of light for producing the image light is split by the first beam splitter 14 into two light beams which are respectively reflected by the first reflective mirror 15 and second reflective mirror 16 to the two light incidence apertures 8 on the upper parabolic mirror 5.

The beam expander 9 disposed in the light incidence aperture 8 performs beam expansion for the reflected light to make it fill the internal cavity formed by the upper and lower parabolic mirrors and irradiate on the object 1 to be diffusely reflected. The diffusely reflected light undergoes multiple times of reflection by the upper and lower parabolic mirrors and forms an objective image 4 above the imaging aperture 7, and the image light during the imaging procedure also irradiates on the holographic plate 3.

The reference light interferes with the image light on the holographic plate 3, and then the recoding of the image surface hologram is completed.

The hologram recording device and hologram recording method according to embodiments of the present disclosure may effectively improve the imaging quality, improve the recording efficiency, and achieve a hologram with a wide angle of view and a good reconstruction effect.

It may be appreciated that the above embodiments are only exemplary embodiments for illustrating the principle of the present disclosure; however the present disclosure is not limited thereto. Various variations and improvements may be made by those having ordinary skill in the art without departing from the spirit and essence of the present disclosure, and these variations and improvements are considered as falling within the protection scope of the present disclosure.

What is claimed is:

1. A hologram recording device, comprising:
   an object imaging unit defining a cavity for accommodating an object, an interior wall of the cavity being a reflective surface; and
   a light modulating unit configured to produce incident light and reference light interfering with the incident light and to direct the incident light to the object imaging unit, the light modulating unit comprising:
      a first beam splitter arranged to split the incident light into two beams of light;
      a laser configured to emit light;
      a second beam splitter configured to split the light emitted by the laser to produce the incident light and the reference light;
      a first reflective mirror; and
      a second reflective mirror,
   wherein the cavity is provided with an imaging aperture for imaging of the object and at least two light incidence apertures for allowing the incident light to enter the cavity and irradiate on the object such that an image of the object is formed at a location corresponding to the imaging aperture outside the cavity, wherein two of the light incidence apertures are located on both sides of the imaging aperture respectively, wherein image light produced upon the imaging of the object interferes with the reference light at the location for recording of an image surface hologram, and
   wherein the first and second reflective mirrors are arranged to adjust an incident direction of the two beams of light respectively so that the two beams of light irradiate into the two light incidence apertures respectively.

2. The hologram recording device according to claim 1, wherein the object imaging unit comprises an upper parabolic mirror and a lower parabolic mirror whose reflective surfaces are arranged opposite to each other, the upper parabolic mirror and lower parabolic mirror jointly forming the cavity.

3. The hologram recording device according to claim 2, wherein the imaging aperture is arranged at a top end of the upper parabolic mirror.

4. The hologram recording device according to claim 1, wherein at least one of the light incidence apertures is provided with a beam expander for beam expansion of the incident light irradiating into at least one of the light incidence.

5. The hologram recording device according to claim 1, further comprising a recording unit comprising a holographic plate arranged at the location, the image light interfering with the reference light on the holographic plate.

6. The hologram recording device according to claim 5, wherein the holographic plate comprises a transparent substrate and a photosensitive material arranged on the substrate.

7. The hologram recording device according to claim 1, wherein the light modulating unit further comprises a third reflective mirror for adjusting a propagation direction of the reference light to allow the reference light to interfere with the image light at the location.

8. The hologram recording device according to claim 7, wherein the light modulating unit further comprises a spatial filter disposed between the second beam splitter and the third reflective mirror, the spatial filter configured to filter noise in the reference light.

9. The hologram recording device according to claim 7, wherein the second beam splitter is a variable beam splitter, and wherein the third reflective mirror is a collimating reflective mirror.

10. The hologram recording device according to claim 1, wherein the first beam splitter is a variable beam splitter, and wherein the first reflective mirror and the second reflective mirror each are a collimating reflective mirror.

11. A hologram recording method using a hologram recording device according to claim 1, the hologram recording method used for recording of an image surface hologram, the hologram recording method comprising steps of:
   providing incident light by the light modulating unit so that the incident light irradiates on an object through the at least two light incidence apertures, the object being placed in the cavity of the object imaging unit; and
   forming an objective image at a location corresponding to the imaging aperture outside the cavity by the incident light irradiating on the object and being reflected by the reflective surface inside the cavity.

12. The hologram recording method according to claim 11, further comprising:
   producing reference light interfering with the incident light by using the light modulating unit;
   arranging a holographic plate at the location corresponding to the imaging aperture outside the cavity;
   interfering image light produced upon the imaging of the object with the reference light on the holographic plate; and
   recording interference stripes.

* * * * *